United States Patent
Liu

(10) Patent No.: US 10,719,285 B2
(45) Date of Patent: Jul. 21, 2020

(54) DISPLAY DEVICE, OPERATING METHOD THEREOF, AND DISPLAY SYSTEM

(71) Applicant: BOE TECHNOLOGY GROUP CO., LTD., Beijing (CN)

(72) Inventor: Kairan Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 81 days.

(21) Appl. No.: 15/768,958

(22) PCT Filed: Jul. 20, 2017

(86) PCT No.: PCT/CN2017/093659
§ 371 (c)(1),
(2) Date: Apr. 17, 2018

(87) PCT Pub. No.: WO2018/126641
PCT Pub. Date: Jul. 12, 2018

(65) Prior Publication Data
US 2019/0278550 A1 Sep. 12, 2019

(30) Foreign Application Priority Data
Jan. 3, 2017 (CN) .......................... 2017 1 0001253

(51) Int. Cl.
*G09G 5/00* (2006.01)
*G06F 3/14* (2006.01)
(Continued)

(52) U.S. Cl.
CPC ........... *G06F 3/1446* (2013.01); *G02B 27/02* (2013.01); *G02B 30/00* (2020.01); *G02B 30/52* (2020.01);
(Continued)

(58) Field of Classification Search
CPC .... G02B 27/22; G02B 27/2214; H04N 13/31; H04N 13/317
See application file for complete search history.

(56) References Cited

U.S. PATENT DOCUMENTS 8,692,738 B2 4/2014 Smithwick et al.
2008/0191963 A1* 8/2008 Ootaki ................... B60K 37/02
345/1.1
(Continued)

FOREIGN PATENT DOCUMENTS

CN 102540485 A 7/2012
CN 103235472 A 8/2013
(Continued)

OTHER PUBLICATIONS

International Search Report dated Oct. 20, 2017.
Second Chinese Office Action dated Mar. 11, 2020.

*Primary Examiner* — Insa Sadio
(74) *Attorney, Agent, or Firm* — Dilworth & Barrese, LLP.; Michael J. Musella, Esq.

(57) ABSTRACT

A display device, an operating method thereof, and a display system are provided. The display device includes a first display panel, a second display panel and an intermediate panel; wherein the intermediate panel has a transparent state and a non-transparent state, the intermediate panel includes a first side and a second side which are disposed opposite to each other, and a first surface and a second surface, which are transflective and disposed opposite to each other, the first display panel is connected to the first side of the intermediate panel and the second display panel is connected to the second side of the intermediate panel.

20 Claims, 4 Drawing Sheets

(51) Int. Cl.
*G02F 1/1343* (2006.01)
*G02F 1/137* (2006.01)
*G02F 1/155* (2006.01)
*G02F 1/163* (2006.01)
*G09G 3/00* (2006.01)
*G02F 1/13* (2006.01)
*G02F 1/15* (2019.01)
*G02B 27/02* (2006.01)
*G02B 30/00* (2020.01)
*G02B 30/52* (2020.01)

(52) U.S. Cl.
CPC ............... *G02F 1/13* (2013.01); *G02F 1/137* (2013.01); *G02F 1/13439* (2013.01); *G02F 1/15* (2013.01); *G02F 1/155* (2013.01); *G02F 1/163* (2013.01); *G09G 3/001* (2013.01); *G02F 2203/09* (2013.01); *G09G 2300/023* (2013.01); *G09G 2300/026* (2013.01)

(56) References Cited

U.S. PATENT DOCUMENTS

| 2011/0216064 | A1* | 9/2011 | Dahl | G06F 1/1616 |
| | | | | 345/428 |
| 2014/0285504 | A1* | 9/2014 | Lin | G06T 1/60 |
| | | | | 345/530 |
| 2015/0271477 | A1 | 9/2015 | Ge et al. | |

FOREIGN PATENT DOCUMENTS

| CN | 203786403 U | 8/2014 |
| CN | 203941346 U | 11/2014 |
| CN | 205281036 U | 6/2016 |
| WO | 2016145048 A1 | 9/2016 |

\* cited by examiner

DISPLAY DEVICE, OPERATING METHOD THEREOF, AND DISPLAY SYSTEM

The present application claims priority of Chinese Patent Application No. 201710001253.4 filed on Jan. 3, 2017, the disclosure of which is hereby entirely incorporated by reference as a portion of the present application.

TECHNICAL FIELD

Embodiments of the present disclosure relate to a display device, an operating method thereof, and a display system.

BACKGROUND

Naked-eye 3D display products are becoming more and more popular, and there are various naked-eye 3D display products in the market. However, designed structures of current products allows users to use such products only from the front side, and when the ambient light is too strong, the ambient light is transmitted through a transflective plate in the product and interfere with displayed images, thus affecting the display effect and not meeting the user's further visual requirements on the product.

SUMMARY

At least one embodiment of the present disclosure provides a display device, comprising a first display panel, a second display panel and an intermediate panel; wherein the intermediate panel has a transparent state and a non-transparent state, the intermediate panel comprises a first side and a second side which are disposed opposite to each other, and a first surface and a second surface, which are transflective and disposed opposite to each other, the first display panel is connected to the first side of the intermediate panel and the second display panel is connected to the second side of the intermediate panel.

For example, in the display device according to at least one embodiment of the present disclosure, in a first state, the first side and the second side are disposed in different horizontal planes, the first display panel is connected to the first side of the intermediate panel, and a display surface of the first display panel can be disposed at a first acute angle with respect to the first surface, and a display surface of the second display panel can be disposed at a second acute angle with respect to the second surface.

For example, in the display device according to at least one embodiment of the present disclosure, the first acute angle and the second acute angle are equal to each other.

For example, in the display device according to at least one embodiment of the present disclosure, the intermediate panel comprises a first transparent electrode layer, an electrochromic layer and a second transparent electrode layer, which are stacked in sequence, and the electrochromic layer has a transparent state and a non-transparent state under effect of an electric field; or, the intermediate panel is a liquid crystal display panel which has a transparent state and a non-transparent state.

For example, in the display device according to at least one embodiment of the present disclosure, at least one of the first display panel and the second display panel is provided with an image capturing device.

For example, in the display device according to at least one embodiment of the present disclosure, in a second state, the first display panel and the second display panel are disposed in a same plane.

For example, in the display device according to at least one embodiment of the present disclosure, in the second state, the intermediate panel at least partially overlaps the first display panel or the second display panel.

For example, in the display device according to at least one embodiment of the present disclosure, a first opening is provided at a position of the first display panel where the first display panel is connected to the first side of the intermediate panel, a first groove is disposed on a side of the first display panel facing the intermediate panel, and the intermediate panel is slidably mounted in the first groove through the first opening.

For example, in the display device according to at least one embodiment of the present disclosure, a second opening is provided at a position of the second display panel where the second display panel is connected to the second side of the intermediate panel, a second groove is disposed on a side of the second display panel away from the intermediate panel, and the intermediate panel is slidably mounted in the second groove through the second opening.

For example, in the display device according to at least one embodiment of the present disclosure, a first opening is provided at a position of the first display panel where the first display panel is connected to the first side of the intermediate panel, a first groove is disposed on a side of the first display panel facing the intermediate panel; a second opening is provided at a position of the second display panel where the second display panel is connected to the second side of the intermediate panel, a second groove is disposed on a side of the second display panel away from the intermediate panel; and the intermediate panel is slidably mounted in the first groove through the first opening, and the intermediate panel is slidably mounted in the second groove through the second opening.

For example, in the display device according to at least one embodiment of the present disclosure, the second display panel is a double-sided display panel which comprises a first display surface and a second display surface disposed opposite to each other.

For example, the display device according to at least one embodiment of the present disclosure further comprises at least one sensing module provided on the first display panel and/or the second display panel, wherein the sensing module is configured to detect a contact state of the first display panel and the second display panel in the second state so as to control on or off of the first display surface or the second display surface of the second display panel.

For example, in the display device according to at least one embodiment of the present disclosure, the first display panel is hinged to the intermediate panel in a manner of rotating by 180 degrees so that in the second state, an end of the first display panel away from the first side of the intermediate panel and an end of the second display panel connected to the second side of the intermediate panel are connected.

For example, in the display device according to at least one embodiment of the present disclosure, a groove is provided at a side of the first display panel facing the intermediate panel, such that the intermediate panel is mounted in the groove after overlapping the first display panel.

For example, in the display device according to at least one embodiment of the present disclosure, the second display panel is hinged to the intermediate panel in a manner of rotating by 180 degrees so that in the second state, an end of the second display panel facing away from the second side of the intermediate panel and an end of the first display panel connected to the first side of the intermediate panel are connected.

For example, in the display device according to at least one embodiment of the present disclosure, a groove is provided at a side of the second display panel facing the intermediate panel, such that the intermediate panel is mounted in the groove after overlapping the second display panel.

At least one embodiment of the present disclosure further provides a display system comprising any one of the display devices mentioned above.

At least one embodiment of the present disclosure further provides an operating method for any one of the display devices mentioned above, comprising: controlling the first display panel and the second display panel comprised in the display device to display an image; and controlling the intermediate panel such that the intermediate panel is in a transparent state or in a non-transparent state.

For example, in the operating method according to at least one embodiment of the present disclosure, when the intermediate panel is in a transparent state, the operating method further comprises: controlling the first display panel and the second display panel to display same content; or controlling the first display panel and the second display panel to display complementary contents.

For example, in the operating method according to at least one embodiment of the present disclosure, when the intermediate panel is in a non-transparent state, the operating method further comprises: controlling the first display panel and the second display panel to display same content, and making the first display panel and the second display panel independently controlled; or controlling the first display panel and the second display panel to display complementary contents.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless defined otherwise, technical and scientific terms used in the present disclosure should have the same meaning as commonly understood by one of ordinary skill in the art to which this disclosure belongs. The terms "first," "second," and similar terms used in the present disclosure do not denote any order, quantity or importance, but merely serve to distinguish different components. The use of "including" or "comprising" and the like means that the element or article preceding the word covers elements or items that appear after the word and their equivalents, but do not exclude other elements or items. The words "connected" or "connected" and the like are not limited to physical or mechanical connections but may include electrical connections, whether direct or indirect. "Up," "Down," "Left," "Right," and the like are used only to indicate a relative positional relationship, and the relative positional relationship may also change correspondingly when the absolute positions of the described objects are changed.

The naked-eye 3D display product can be designed using the Pepper's ghost principle. For example, such a product can include a display screen, a transflective plate, and a supporting plate. When being viewed, the display screen, the transflective plate, and the supporting plate can be configured in, for example, a zigzag structure such that displayed image of the display screen can be presented as a suspended three-dimensional image through reflection and transmission of the transflective plate.

Figure 1:
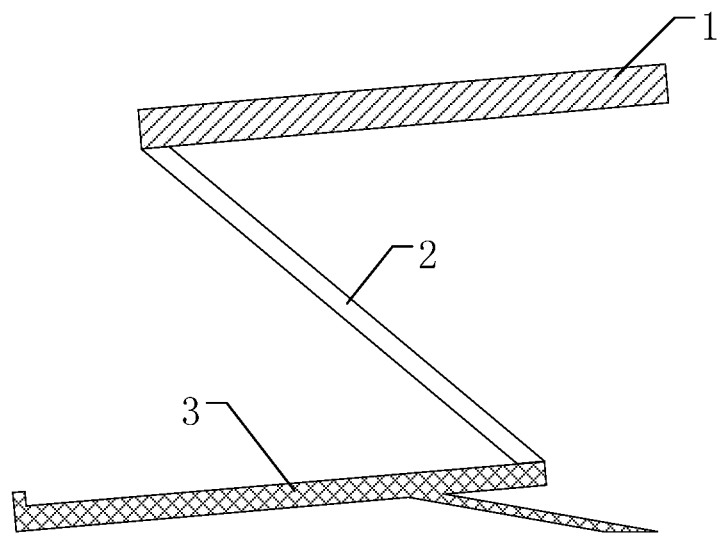
FIG. 1 is a cross-sectional structural diagram of a naked-eye three-dimensional display device.

The naked-eye 3D display product mentioned above can display a 3D image only in front of it (that is, the image can only be viewed in one direction), and the viewing effect will be affected as the display effect of the product is affected by ambient light. FIG. 1 is a schematic cross-sectional structural view of a naked-eye 3D display device. As illustrated in FIG. 1, the 3D display device comprises a display screen 1, a transflective plate 2 and a supporting portion 3. The three elements are connected to form a zigzag structure, and the supporting portion 3 provides support for the 3D display device. The display screen 1 provides a display image that is presented at front of the display device (taking a side where the display screen 1 is located with respect to the transflective plate 2 as the front) through reflection and transmission of the transflective plate 2 as a suspended 3D displayed imaged, so as to be viewed by a naked-eye. However, the display image can only be viewed at front of the display device, and if the ambient light is too strong, the ambient light will passes through the transflective plate 2 and affect the display of the 3D image, thus reducing the viewing effect.

At least one embodiment of the present disclosure provides a display device, an operating method thereof, and a display system. A better display effect can be provided with respect to the display device mentioned above, and various operation modes and more abundant functions can be achieved.

At least one embodiment of the present disclosure provides a display panel comprising a first display panel, a second display panel and a intermediate panel, wherein the intermediate panel has a transparent state and a non-transparent state, the intermediate panel comprises a first side and a second side which are disposed opposite to each other, and a first surface and a second surface, which are transflective and disposed opposite to each other, the first display panel is connected to the first side of the intermediate panel and the second display panel is connected to the second side of the intermediate panel.

For example, in at least one embodiment of the present disclosure, the display device can be in, for example, a first state, wherein the first side and the second side are disposed, for example, in different horizontal planes, and a display surface of the first display panel can be disposed at a first acute angle with respect to the first surface, a display surface of the second display panel can be disposed at a second acute angle with respect to the second surface.

In at least one embodiment of the present disclosure, the display device comprise two display panels (i.e., the first display panel and the second display panel) and a intermediate panel, the intermediate panel can be configured to be a transflective panel and to transmit and reflect images provided by the first display panel and the second display panel. A stereo display effect of a 3D image can be enhanced by controlling display contents of the two display panels, and, for example, display contents of the two display panels can enhance each other, and one of the two display contents is a foreground content and the other is a background content. And for example again, taking that the first display panel displays a foreground content as an example, an image displayed by the second display panel after being transmitted through the intermediate panel overlaps or substantially coincides with an image provided by the first display panel and reflected by the intermediate panel so as to make an observed floating image more vivid. In some embodiments, the intermediate panel, for example, when configured in a non-transparent state, can reduce transmission of ambient light to reduce the influence of ambient light. In some embodiments, the display images of the first display panel and the second display panel can also be individually controlled to increase the viewing angle. The intermediate panel can also be controlled to be a transflective panel to reflect the images displayed by the first display panel and the second display panel such that the first and second display panels can be independently controlled.

It should be noted that, in at least one embodiment of the present disclosure, the first state is a stable state where the display device displays images with a combination of structural components thereof having a zigzag shape; however, the display device can also be, for example, a deformable structure and can be deformed into other structural forms and can display images, so the display device is not limited to having a first state, and can also have a second state, a third state, etc. according to different display states after deformation.

In at least one embodiment of the present disclosure, the transmittance or reflectivity of light in the transparent state, the non-transparent state, and the transflective state of the intermediate panel is not particularly limited and can be limited according to actual applications. For example, in at least one embodiment of the present disclosure, the transparent state of the intermediate panel refers to a state in which light transmittance is greater than 50%, preferably greater than 75%, while the non-transparent state of the intermediate panel refers to a state in which light transmittance is less than 50%, preferably less than 25%, and the transflective state refers to a state in which the intermediate panel is partially reflective, for example reflectivity thereof being in a range of 25% to 75%.

Figure 2:
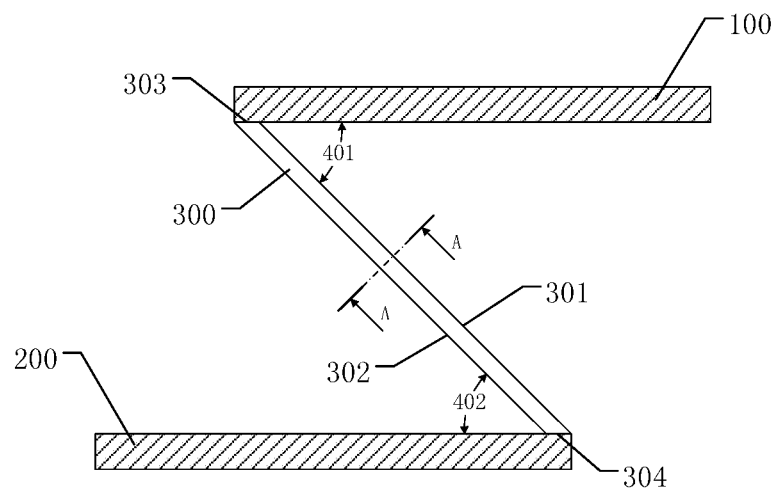
FIG. 2 is a schematic cross-sectional structural view of a display device according to an embodiment of the present disclosure in the first state.

At least one embodiment of the present disclosure provides a display device, and FIG. 2 is a schematic cross-sectional structural view of the display device in a first state. For example, as illustrated in FIG. 2, the display device comprises a first display panel 100, a second display panel 200 and an intermediate panel 300.

For example, in some embodiments of the present disclosure, the intermediate panel 300 can be an electrochromic panel, which can comprise an electrochromic layer (not shown in FIG. 2) which has a transparent state and a non-transparent state under effect of an electric field. For example, in other embodiments of the present disclosure, the intermediate panel 300 can also be a liquid crystal display panel, which can also have a transparent state and a non-transparent state during operation. For the above two types of the intermediate panel 300, the transparent state and the non-transparent state can be respectively achieved, descriptions of which can refer to relative contents in the following embodiments, and will not be elaborated here.

The intermediate panel 300 comprises a first side 303 and a second side 304 that are opposite to each other, and a first surface 301 and a second surface 302, which are transflective and disposed opposite to each other. In the first state, the first display panel 100 is connected to the first side 303 of the intermediate panel 300 and the display surface of the first display panel 100 can be disposed at a first acute angle 401 with respect to the first surface 301 and the second display panel 200 is connected to the second side 304 of the intermediate panel 300, and the display surface of the second display panel 200 can be disposed at a second acute angle 402 with respect the second surface 302.

The specific structures of the first display panel and the second display panel of the display device are not limited. For example, the first display panel and the second display panel can be conventional 2D display panels or 3D display panels. The 2D display panel can be a liquid crystal display panel or an organic light emitting diode (OLED) display panel; and the 3D display panel can comprise, for example, a liquid crystal display panel or an organic light emitting diode (OLED) display panel and a light splitting device. For example, the light splitting device can comprise a slit grating, a lenticular lens, or the like, and is usually provided on the light emitting side of a liquid crystal display panel or an OLED display panel.

The manner in which the image is provided in the display device is not limited to providing images through only the first display panel and the second display panel, both of which are fixed, and the first display panel or the second display panel, for example, can be replaceable. For example, the first display panel and the second display panel can be replaced by a frame that can accommodate a mobile display terminal that provides an image. For example, the mobile display terminal can be a display device such as a mobile phone or a tablet computer.

In at least one embodiment of the present disclosure, to satisfy the condition that the display device forms a suspended 3D image, the first acute angle and the second acute angle are within a range less than 90 degree, more specifically, the angles range from 30 degrees to 60 degrees, and the angle is most preferred to be 45 degree. For example, when both the first acute angle and the second acute angle are 45 degree, the images provided by the first display panel and the second display panel can be seen by the human eye in the same proportion, so as to achieve the best visual effect.

Figure 3A:
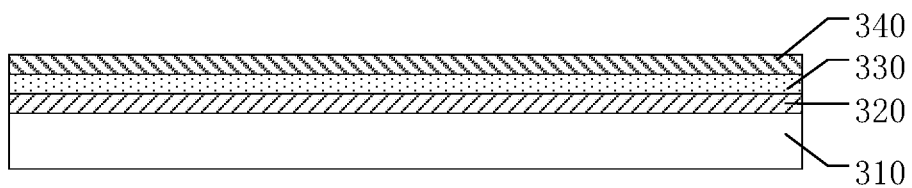
FIG. 3A is a schematic structural view of a intermediate panel of the display device illustrated in FIG. 2 taken along A-A section.

For example, in the display device according to at least one embodiment of the present disclosure, the intermediate panel 300 can be an electrochromic panel, and the electrochromic panel can comprise a first transparent electrode layer, an electrochromic layer and a second transparent electrode layer, which are stacked in sequence. FIG. 3A is a schematic structural view of an intermediate panel of the display device illustrated in FIG. 2, taken along the cross section A-A, wherein the intermediate panel is an electrochromic panel. As illustrated in FIG. 3A, the intermediate panel 300 can further comprise a substrate 310 and a first transparent electrode layer 320, an electrochromic layer 330 and a second transparent electrode layer 340 sequentially disposed on the substrate 310. For example, the first transparent electrode layer 320 and the second transparent electrode layer 340 can be formed on the same side of the substrate 310. It should be noted that the first transparent electrode layer 320 and the second transparent electrode layer 340 can also be formed on different sides of the substrate 310 as long as the electrochromic layer 330 is sandwiched therebetween. Specific positions of the first transparent electrode layer 320 and the second transparent electrode layer 340 are not limited in the embodiments of the present disclosure.

A voltage can be applied to the first transparent electrode layer 320 and the second transparent electrode layer 340 so as to form an electric field therebetween, and the transparency of the electrochromic layer 330 can be adjusted by applying the electric field to the electrochromic layer 330. For example, after the electrochromic layer 330 is applied with an electric field, the electrochromic layer 330 is converted from a transparent state to a non-transparent state, and different transparency can be achieved by applying different voltages. The electrochromic layer 330 in the non-transparent state can block the ambient light or the light emitted by the display panel from passing through the intermediate panel 300 to avoid defects in the display image caused by interference.

In at least one embodiment of the present disclosure, the intermediate panel 300 can be configured to be transflective, wherein light can be transmitted as well as reflected. For example, the substrate 310 of the intermediate panel 300 can be made of a material having a transmission and reflection function, or a material having a transmission and reflection function can be disposed on a surface thereof. The substrate 310 can be made of polycarbonate, glass, plastic, acrylic, or the like.

For example, in the display device according to at least one embodiment of the present disclosure, material for the electrochromic layer 330 is not limited. For example, the material for the electrochromic layer can comprise tungsten trioxide, polythiophenes and their derivatives, violins, tetrathiafulvalene or metal phthalocyanine compounds, and the like.

Figure 3B:
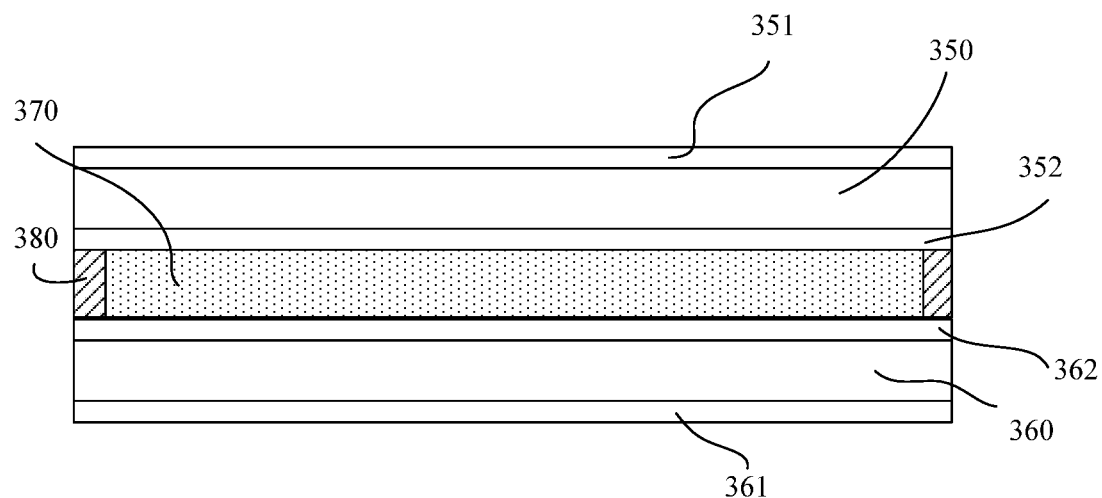
FIG. 3B is a schematic structural view of another intermediate panel of the display device as illustrated in FIG. 2 taken along A-A section.

In the display device according to at least one embodiment of the present disclosure, the intermediate panel can be a liquid crystal display panel. FIG. 3B is a schematic structural view of another intermediate panel of the display device illustrated in FIG. 2, taken along the A-A cross section. The intermediate panel is a liquid crystal display panel. For example, the liquid crystal display panel comprises a first substrate 350, a second substrate 360, and a liquid crystal layer 370 sandwiched between the first substrate 350 and the second substrate 360, the first substrate 350 and the second substrate 360 are bonded to each other by a sealant 380 to obtain a liquid crystal cell. With respect to the liquid crystal layer 370 sandwiched between the first substrate 350 and the second substrate 360, the first polarizer 351 is disposed outside the first substrate 350 and the first electrode layer 352 is disposed on the first substrate 350, the second polarizer 361 is disposed outside the second substrate 360, and the second electrode layer 362 is disposed on the substrate 360. The polarization axis of the first polarizer 351 and the polarization axis of the second polarizer 361 are parallel or perpendicular to each other. When a voltage is applied across the first electrode layer 352 and the second electrode layer 362, a vertical electric field is formed between the first substrate 350 and the second substrate 360, which can control the degree of deflection of the liquid crystal molecules in the liquid crystal layer 370 so that the transmittance of the light passing through the liquid crystal display panel can be adjusted with the cooperation of the first polarizer 351 and the second polarizer 361, thereby achieve the transparent state and the non-transparent state. Moreover, different transmittance can be achieved by applying different voltages. The arrangement of the first electrode layer 352 and the second electrode layer 362 is not limited to the inner portions of the first substrate 350 and the second substrate 360, as mentioned above. For example, the first electrode layer 352 and the second electrode layer 362 can be respectively formed on the outsides of the first substrate 350 and the second substrate 360, as long as the same technical effect can be achieved only by controlling the deflection of the liquid crystal molecules in the liquid crystal layer 370.

For example, in the display device according to at least one embodiment of the present disclosure, at least one of the first display panel and the second display panel is provided with an image capturing device. More specifically, for example, the image capturing device can comprise a human eye tracking unit.

Figure 4:
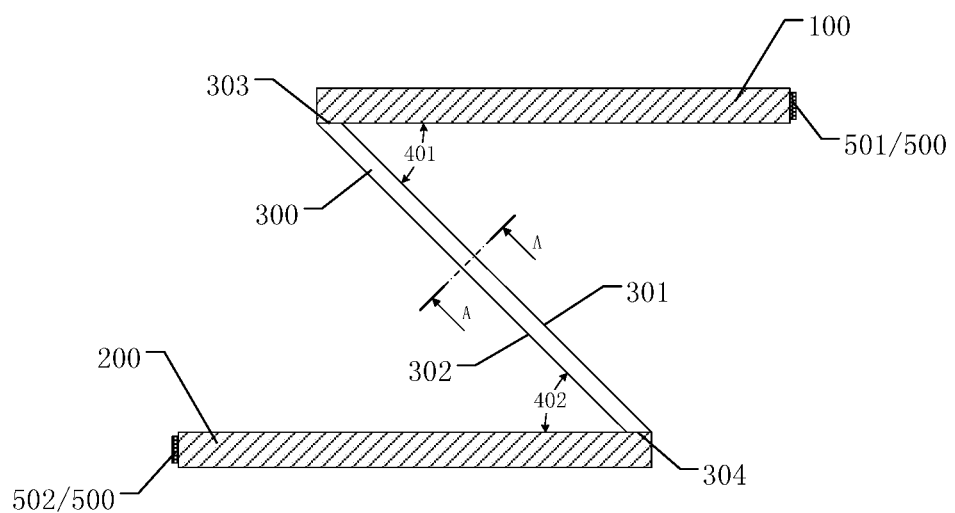
FIG. 4 is a schematic cross-sectional structural view of a display device according to another embodiment of the present disclosure.

FIG. 4 is a schematic cross-sectional view of another display device according to an embodiment of the present disclosure. For example, as illustrated in FIG. 4, at least one of the first display panel 100 and the second display panel 200 is provided with an image capturing device 500, which can be disposed, for example, at an end of the first display panel 100 and the second display panel 200 away from the intermediate panel 300. The image capturing device 500 can capture image information of the surrounding so that the display images provided by the first display panel 100 and the second display panel 200 can be adjusted. For example, the image capturing device 500 can comprise a human eye tracking unit (such as a first human eye tracking unit 501 provided on the first display panel 100 and a second human eye tracking unit 502 provided on the second display panel 200). For example, the human eye tracking unit comprises a camera module or the like that can monitor the positions of peripheral images such as human eyes at any time so that the display images provided by the first display panel 100 and the second display panel 200 or the angles with respect to the intermediate panel can be adjusted in time so as to avoid phenomena such as ghosting and the like because the observed display images can not overlap due to the change of the position of the human eye.

The first display panel 100 and the second display panel 200 are not limited to the same type. For example, in the display device according to at least one embodiment of the present disclosure, at least one of the first display panel 100 and the second display panel 200 can be configured as a naked-eye 3D display panel. For example, the first display panel 100 can be configured to provide a 3D display image, and the second display panel 200 can be configured to provide a 2D display image. The 2D display image can also overlap with the reflected 3D display image after passing through the intermediate panel 300 so as to display suspended naked-eye 3D images.

For example, in the display device according to at least one embodiment of the present disclosure, as illustrated in FIG. 4, the first acute angle 401 and the second acute angle 402 are equal to each other, so that, for example, when a 3D image displayed in two opposite directions, a horizontal and direct-facing image is provided to observers in both directions.

The display device in the above embodiment can have, for example, an integral Z-shaped structure, which is formed by a first display panel, an intermediate panel and a second display panel. For example, the first display panel, the intermediate panel and the second display panel can also be configured to be movably connected. For example, the first display panel and the intermediate panel can be configured to be movably connected through a bearing, and the second display panel and the intermediate panel can be movably connected through a bearing.

Figure 5:
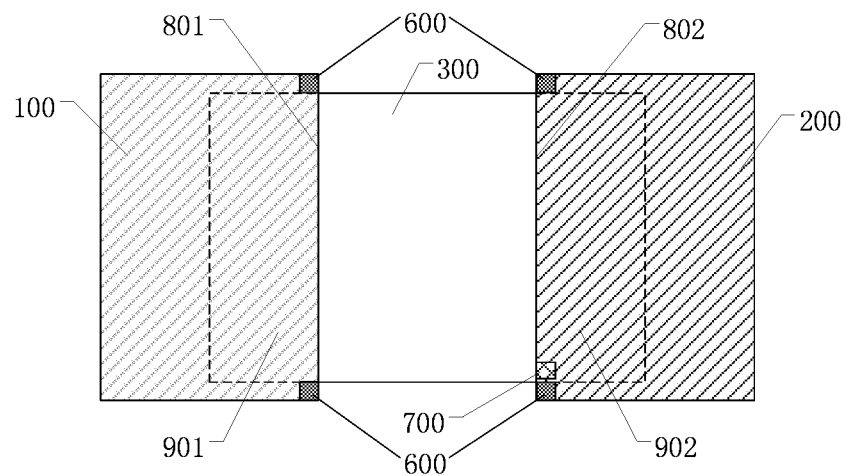
FIG. 5 is a schematic plan view of a display device according to still another embodiment of the present disclosure.
Figure 6:
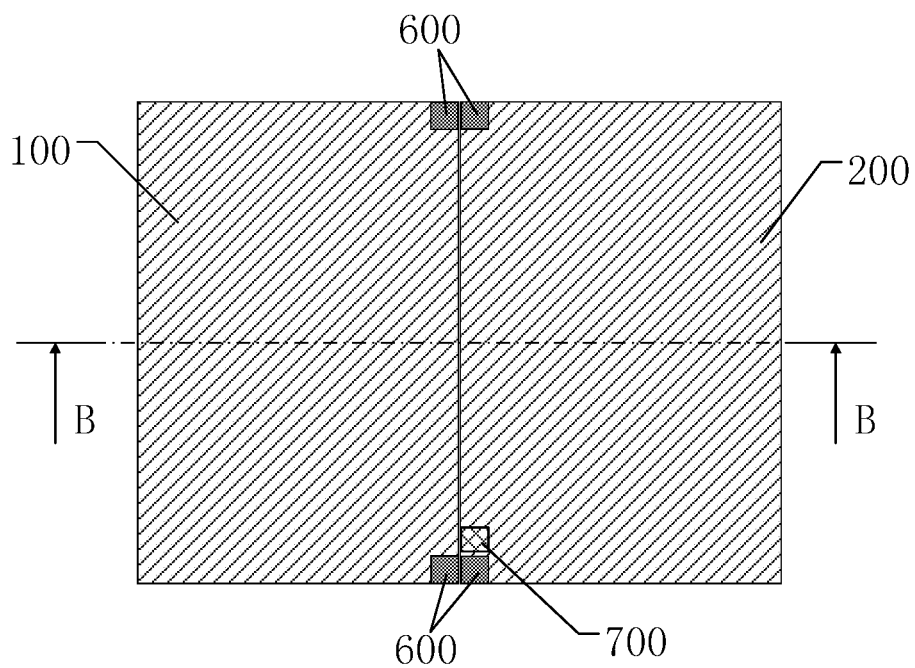
FIG. 6 is a schematic plan view of the display device as illustrated in FIG. 5 in the second state.

For example, at least one embodiment of the present disclosure provides a display device, which may be, for example, the second state of the display device according to the above embodiments. FIG. 5 is a schematic plan view of another display device according to an embodiment of the present disclosure; and FIG. 6 is a schematic plan view of the display device illustrated in FIG. 5 in a second state. For example, as illustrated in FIG. 5, the display device is transformed before in the second state. For example, the display device in the first state is stretched such that the first display panel 100, the intermediate panel 300 and the second display panel 200 are in the same horizontal plane and the intermediate panel 300 is between the first display panel 100 and the second display panel 200. As illustrated in FIG. 6, the first display panel 100 and the second display panel 200 are connected to each other so as to form a flat screen, and the total display area of the flat screen is, for example, the sum of the display area of the first display panel 100 and the display area of the second display panel 200. Then, the display device is in the second state, wherein the intermediate panel 300 at least partially overlaps the first display panel 100 or the second display panel 200 so that, for example, the intermediate panel 300 can be located only behind the first display panel 100 or just behind the second display panel 200 or behind both the first display panel 100 and the second display panel 200 concurrently.

For example, in the display device according to at least one embodiment of the present disclosure, a first opening 801 is provided at a position of the first display panel 100 at which is connected to the first side 303 of the intermediate panel 300, and a first groove 901 is disposed on a side of the first display panel 100 facing the intermediate panel 300. For example, in at least one embodiment of the present disclosure, a position of the second display panel 200 connected with the second side 304 of the intermediate panel 300 can be provided with a second opening 802, a side of the second display panel 200 facing away from the intermediate panel 300 is provided with a second groove 902. For example, in at least one embodiment of the present disclosure, the intermediate panel 300 is slidably mounted in the first groove 901 through the first opening 801 or slidably mounted in the second groove 902 through the second opening 802. Alternatively, the intermediate panel 300 is slidably mounted in the first groove 901 and the second groove 902 through the first opening 801 and the second opening 802, respectively.

For example, in the display device according to at least one embodiment of the present disclosure, as illustrated in FIG. 5, a side of the first display panel 100 and a side of the second display panel 200 facing each other, are provided with a buckle 700, respectively. When the display device is in the second state, the buckle 700 can fasten the first display panel 100 and the second display panel 200 together, for example.

For example, in the display device according to at least one embodiment of the present disclosure, as illustrated in FIG. 5 or FIG. 6, at least one of the first display panel 100 and the second display panel 200 is a double-sided display panel, that is, has two display surfaces. For ease of understanding, taking the second display panel 200 as a double-sided display panel, the second display panel 200 comprises a first display surface and a second display surface (not illustrated in the figures) arranged opposite to each other. However, one of ordinary skill in the art should note that the first display panel 100 can also be configured as a double-sided display panel. For example, the two display surfaces of the double-sided display panel 200 can be individually controlled, for example, to be switched on or off or to display different contents. For example, when the display device is in the first state, the first display surface of the second display panel 200 and the display surface of the first display panel 100 jointly provide the display images. After undergoing the deformed structure as illustrated in FIG. 5 and FIG. 6, the display device is in the second state. Then, the second display surface of the second display panel 200 and the display surface of the first display panel 100 are located on the same side, and jointly provide the display images.

For example, in the display device according to at least one embodiment of the present disclosure, as illustrated in FIG. 5, at least one sensing module 700 can further be provided on the first display panel 100 and/or the second display panel 200, wherein the sensing module 700 can be configured to detect a contact state of the first display panel 100 and the second display panel 200 so as to control on or off of the first display surface or the second display surface of the second display panel 200 that is a double-sided display panel. For example, upon the sensing module 700 detecting that the first display panel 100 and the second display panel 200 are spliced with each other, for example, if the second display surface of the second display panel is turned on, the second display surface of the second display panel and the first display panel 100 collectively provide a display image, and upon the sensing module 700 detecting that the first display panel 100 and the second display panel 200 are separated, the first display surface of the second display panel can be turned on, and the second display surface can be, for example, turned off by default.

Figure 7:
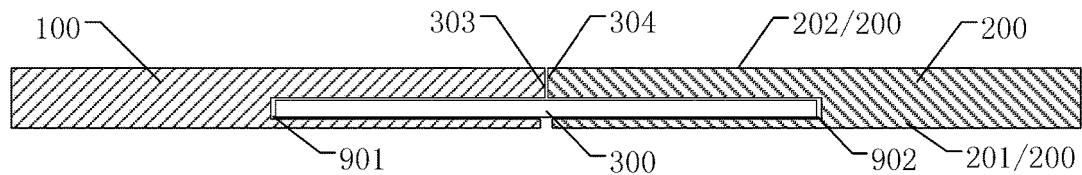
FIG. 7 is a schematic structural view of the display device as illustrated in FIG. 6 taken along B-B section.

FIG. 7 is a schematic structural view of the display device taken along a B-B cross section as illustrated in FIG. 6. For example, as illustrated in FIG. 7, the display device is in the second state, the first display panel 100 is spliced with the second display panel 200, and after the first display panel 100 is spliced with the second display panel 200, for example, the first display panel 100 and the second display panel 200 are disposed on the same level. For example, a first groove 901 is provided on the first display panel 100, a second groove 902 is provided on the second display panel 200, and the intermediate panel 300 is located within the first groove 901 and the second groove 902 simultaneously, and the intermediate panel 300 at least partially overlaps the first display panel 100 and the second display panel 200. For example, when the display device is in the first state, the first display panel 100 and the first display surface 201 jointly provide a display image for the display device, and when the display device is in the second state as illustrated in FIG. 7, the second display surface 202 and the first The display panel 100 jointly provides a display image for the display device.

For example, in at least one embodiment of the present disclosure, the display device is not limited to the deformation manner as described in the foregoing embodiments. For example, in at least one embodiment of the present disclosure, the first display panel can be hinged to the intermediate panel in a manner of rotating by 180 degrees so that in the second state, an end of the first display panel away from the first side of the intermediate panel and an end of the second display panel connected to the second side of the intermediate panel are connected, or the second display panel can be hinged to the intermediate panel in a manner of rotating by 180 degrees so that in the second state an end of the second display panel away from the second side of the intermediate panel and an end of the first display panel connected to the first side of the intermediate panel are connected.

For example, in the display device according to at least one embodiment of the present disclosure, a side edge of the first display panel facing the intermediate panel can be provided with a groove, so that the intermediate panel is accommodated in the groove after being overlapped with the first display panel.

The first display panel can be folded in two directions relative to the intermediate panel. The grooves can also be provided on at least one of two opposite surfaces of the first display panel. For example, when both the first display panel and the second display panel are single-sided displays, and when the first display panel is folded, the display surfaces of the first display panel and the second display panel may not be on the same side. In this case, at least one of the first display panel and the second display panel is configured as a double-sided display so that the first display panel and the second display panel can display on the same side after being spliced. For example, the groove can also be disposed in the second display panel, and the intermediate panel can also be overlapped and installed in the groove of the second display panel. For example, the first display panel and the second display panel are not be provided with grooves. Taking the first display panel and the intermediate panel overlapping with each other as an example, the first display panel can be connected with the second display panel after being overlapped with the intermediate panel. Then, the thickness of the second display panel can be the sum of the thickness of the first display panel and the thickness of the intermediate panel, for example, so that the two main surfaces facing each other of the display device after connection are combined into a plane.

For example, in at least one embodiment of the present disclosure, the connection relationship between the first display panel 100, the intermediate panel 300, and the second display panel 200 is not limited. For example, the first display panel 100, the intermediate panel 300 and the second display panel 200 are not limited to be configured as the fixed connection in the foregoing embodiment, and can also be configured as a freely assembled connection. For example, the first display panel 100, the intermediate panel 300 and the second display panel 200 are be detachable and can be assembled with each other and the manner of assembling is not limited as long as the recombined display device can provide a display image to a user and can produce the same technical effect. For example, the intermediate panel can be removed and the first display panel and the second display panel can be connected together to form, for example, a flat panel display panel having a larger display area.

At least one embodiment of the present disclosure further provides a display system, which can comprise the display device according to any one of the above embodiments. For example, the display system can further comprise a control device, a storage device, a video encoding/decoding device, a communication device, and the like. For example, the communication device can be a wireless local area network (such as WIFI) device, a bluetooth device, an infrared device, or the like, thereby controlling the display system through a remote control device such as a mobile phone, a tablet, and etc. A signal, such as a wireless signal, can be sent to the display device to control its image display.

Figure 8:
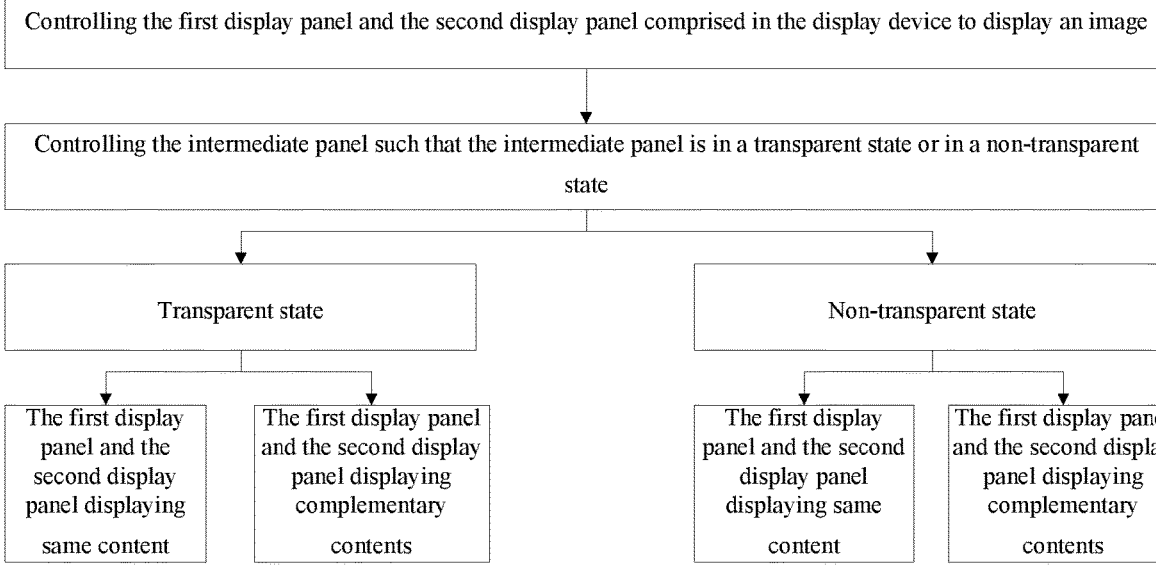
FIG. 8 is a flow chart of an operating method for a display device according to an embodiment of the present disclosure.

At least one embodiment of the present disclosure further provides an operating method for display device according to any one of the above embodiments. FIG. 8 is a flowchart illustrating an operating method for a display device according to an embodiment of the present disclosure. For example, as illustrated in FIG. 8, the operating method comprises: controlling the first display panel and the second display panel included in the display device to display an image; and controlling the intermediate panel such that the intermediate panel is in a transparent state or in a non-transparent state.

When the intermediate panel is in a transparent state, for example, an image of the second display panel can pass through the intermediate panel and overlap with an image of the second display panel reflected by the surface of the intermediate panel, thereby making the rendered three-dimensional image more three-dimensional. When the intermediate panel is an electrochromic panel, an electric field is applied to an electrochromic layer through the first transparent electrode and the second transparent electrode, and the electrochromic layer becomes non-transparent, and then the light transmittance of the intermediate panel is reduced, and the display device renders images by means of the reflection on the surface of the intermediate panel, which can reduce the interference on the display image of the display device due to ambient light or light emitted from the other display panel transmitting through the intermediate panel. A similar effect can also be achieved when the intermediate panel is a liquid crystal display panel.

For example, in the operating method for display device according to at least one embodiment of the present disclosure, as illustrated in FIG. 8, when the intermediate panel is in a transparent state, for example, the first display panel and the second display panel can also be controlled to display the same content; or for example, the first display panel and the second display panel can be controlled to display complementary contents. Two sides corresponding to the first display panel and the second display panel of the display device can be configured to perform a 3D image display function or a 2D image display function, respectively. For example, taking a view from the side where the first display panel of the display device is located as an example, a display image provided by the second display panel and passing through the intermediate panel and a display image provided by the first display panel and reflected by the intermediate panel are coincided with each other so as to form a final naked-eye 3D image. For example, the display image provided by the first display panel is an upside-down image (which can be understood as that the image is an inverted image and becomes an erect image after reflection by the intermediate panel).

For example, in at least one embodiment of the present disclosure, when the intermediate panel is in a transparent state, for example, the first display panel and the second display panel can be controlled to display the same content. In this case, the images with the same content completely or substantially coincide with each other, such that a naked eye three-dimensional image, for example, observed by the user, is clearer and more realistic.

For example, in at least one embodiment of the present disclosure, when the intermediate panel is in a transparent state, for example, the first display panel and the second display panel are controlled to display mutually complementary contents. For example, the display image provided by the first display panel can include a first image element such as a sun or a tree. Correspondingly, the display image provided by the second display panel can include a second image element such as a river or a lawn. Taking the observation from a side at which the first display panel of the display device is located as an example, the naked-eye 3D image finally provided to the user is a combination of the second image element transmitted through the intermediate panel and the first image element reflected by the intermediate panel. The naked-eye 3D image formed under such a condition can bring the user a more stereo visual sense.

For example, in at least one embodiment of the present disclosure, when the intermediate panel is in a transparent state, for example, display contents of the first display panel and the second display panel are independently controlled, then, the user can freely adjust display contents respectively displayed by the first display panel and the second display panel, so as to form display images meeting his own requirements. For example, in the case of, for example, mapping game, part of the contents of the game such as a basic block diagram is displayed by, for example, the first display panel, remaining contents of the game such as a painting portion are displayed by, for example, the second display panel. The first display panel and the second display panel can be individually controlled to select the basic block diagram and the kind of painting.

For example, in at least one embodiment of the present disclosure, as illustrated in FIG. 8, when the intermediate panel is in a non-transparent state, for example, the first display panel and the second display panel can be controlled to display the same content, and the first display panel and the second display panel can be independently controlled; or the first display panel and the second display panel can be controlled to display different contents. At this time, the display device provides images to the user by reflecting the display images provided by the first display panel and the second display panel by means of the intermediate panel, and the display image can be provided to the user at both sides of the display device (i.e., the two sides where the first display panel and the second display panel of the display device are respectively located), that is, increasing the number of display images of the display device or increasing the viewing angles and the number of users. And since the light transmittance of the intermediate panel is very low at this time, the display images respectively provided by the first display panel and the second display panel will not interfere with each other.

For example, in at least one embodiment of the present disclosure, when the intermediate panel is in a non-transparent state, for example, the first display panel and the second display panel are controlled to display the same content. For example, the first display panel and the second display panel can provide synchronized display images to facilitate, for example, instant communication between users.

For example, in at least one embodiment of the present disclosure, when the intermediate panel is in a non-transparent state, for example, the contents respectively displayed on the first display panel and the second display panel can also be separately controlled. For example, the users can jointly participate in an activity task such as creating a portrait, and the contents respectively displayed by the first display panel and the second display panel can be correlated with each other. For example, a user on one side of the display device can present changes in the portrait in real time to another user on the other side of the display device, such that the users on different sides of the display device can work together to complete the portrait.

For example, in at least one embodiment of the present disclosure, when the intermediate panel is in a non-transparent state, for example, the first display panel and the second display panel can be controlled to display different contents, that is, for example, the users can operate freely according to their requirements. For example, a user on one side of the display device, for example, can watch a video while a user on the opposite side, for example, can play a game. For example, directional sound propagation technology such as directional loudspeakers and the like can be used in the display device so as to make the activities of users on both sides undisturbed.

It should be noted that the above embodiments provide an operating method for the display device in the first state. When the display device is in the second state, for example, the display device can be in a 2D display state. The display method can be a conventional operating method for a 2D display device, and additionally, the display method can also adopt the above operating method.

Embodiments of the present disclosure provide a display apparatus, an operating method therefor, and a display system, and can produce at least one of the following advantageous effects:

(1) At least one embodiment of the present disclosure provides a display device in which display images provided by a first display panel and a second display panel can coincide with each other when the intermediate panel is in a transparent state so that 3D effect and suspension effect of a display image of the display device can be increased.

(2) In the display device according to at least one embodiment of the present disclosure, the two display panels of the display device can be independently controlled when the intermediate panel is in a non-transparent state, and the influence of ambient light and the like on the display device can be reduced.

(3) In the display device according to at least one embodiment of the present disclosure, the display device can provide a display image to users at different locations (for example, at two opposite sides of the display device), and a viewing angle of the display device can be increased.

(4) In the display device according to at least one embodiment of the present disclosure, the first display panel and the second display panel can provide the same, mutually enhanced, associated or individually controlled contents so as to meet user's demands on different functions of the display device (5) In the display device according to at least one embodiment of the present disclosure, the display device can change the form so as to be able to be switched between, for example, 3D display state and 2D display state.

For the present disclosure, the followings need to be explained.

(1) The accompanying drawings in the embodiments of the present disclosure only relate to those structures associated with the embodiments of the present disclosure. As to other structures, reference can be made to typical designs (2) For the sake of clarity, in the drawings used to depict the embodiments of the present disclosure, the thickness of a layer or a region is enlarged or reduced, that is, the drawings are not drawn to scale.

(3) Without conflicts, the embodiments of the present disclosure and the features of the embodiments can be combined with each other so as to obtain a new embodiment.

The foregoing are merely exemplary embodiments of the disclosure, but are not used to limit the protection scope of the disclosure. The protection scope of the disclosure shall be defined by the attached claims.

The invention claimed is:

1. A display device, comprising:
   a first display panel, a second display panel and an intermediate panel;
   wherein the intermediate panel has a transparent state and a non-transparent state, the intermediate panel comprises a first side and a second side which are disposed opposite to each other, and a first surface and a second surface, which are transflective and disposed opposite to each other, the first display panel is connected to the first side of the intermediate panel and the second display panel is connected to the second side of the intermediate panel,
   wherein the intermediate panel is controlled to transmit and reflect images provided by the first display panel and the second display panel,
   wherein the intermediate panel comprises a first substrate, a second substrate, and a liquid crystal layer sandwiched between the first substrate and the second substrate, with respect to the liquid crystal layer, a first polarizer is disposed outside the first substrate and a first electrode layer is disposed on the first substrate, a second polarizer is disposed outside the second substrate, and a second electrode layer is disposed on the substrate, and a polarization axis of the first polarizer and a polarization axis of the second polarizer are parallel or perpendicular to each other.

2. The display device according to claim 1, wherein, in a first state, the first side and the second side are disposed in different horizontal planes, and a display surface of the first display panel can be disposed at a first acute angle with respect to the first surface, a display surface of the second display panel can be disposed at a second acute angle with respect to the second surface.

3. The display device according to claim 1, wherein the first acute angle and the second acute angle are equal to each other.

4. The display device according to claim 1, wherein the intermediate panel is a liquid crystal display panel which has a transparent state and a non-transparent state.

5. The display device according to claim 1, wherein at least one of the first display panel and the second display panel is provided with an image capturing device.

6. The display device according to claim 1, wherein, in a second state, the first display panel and the second display panel are disposed in a same plane.

7. The display device according to claim 1, wherein, in the second state, the intermediate panel at least partially overlaps the first display panel or the second display panel.

8. The display device according to claim 6, wherein a first opening is provided at a position of the first display panel where the first display panel is connected to the first side of the intermediate panel, a first groove is disposed on a side of the first display panel facing the intermediate panel, and the intermediate panel is slidably mounted in the first groove through the first opening.

9. The display device according to claim 6, wherein a second opening is provided at a position of the second display panel where the second display panel is connected to the second side of the intermediate panel, a second groove is disposed on a side of the second display panel away from the intermediate panel, and the intermediate panel is slidably mounted in the second groove through the second opening.

10. The display device according to claim 6, wherein a first opening is provided at a position of the first display panel where the first display panel is connected to the first side of the intermediate panel, a first groove is disposed on a side of the first display panel facing the intermediate panel; a second opening is provided at a position of the second display panel where the second display panel is connected to the second side of the intermediate panel, a second groove is disposed on a side of the second display panel away from the intermediate panel; and
   the intermediate panel is slidably mounted in the first groove through the first opening, and the intermediate panel is slidably mounted in the second groove through the second opening.

11. The display device according to claim 6, wherein the second display panel is a double-sided display panel which comprises a first display surface and a second display surface disposed opposite to each other.

12. The display device according to claim 11, further comprising at least one sensing module provided on the first display panel and/or the second display panel, wherein the sensing module is configured to detect a contact state of the first display panel and the second display panel so as to control on or off of the first display surface or the second display surface of the second display panel.

13. The display device according to claim 6, wherein the first display panel is hinged to the intermediate panel in a manner of rotating by 180 degrees so that in the second state, an end of the first display panel away from the first side of the intermediate panel and an end of the second display panel connected to the second side of the intermediate panel are connected.

14. The display device according to claim 13, wherein
   a groove is provided at a side of the first display panel facing the intermediate panel, such that the intermediate panel is mounted in the groove after overlapping the first display panel.

15. The display device according to claim 6, wherein the second display panel is hinged to the intermediate panel in a manner of rotating by 180 degrees so that in the second state, an end of the second display panel away from the second side of the intermediate panel and an end of the first display panel connected to the first side of the intermediate panel are connected.

16. The display device according to claim 15, wherein
   a groove is provided at a side of the second display panel facing the intermediate panel, such that the intermediate panel is mounted in the groove after overlapping the second display panel.

17. A display system, comprising the display device according to claim 1.

18. An operating method for the display device according to claim 1, comprising:
- controlling the first display panel and the second display panel comprised in the display device to display an image; and
- controlling the intermediate panel such that the intermediate panel is in a transparent state or in a non-transparent state.

19. The operating method according to claim 18, wherein when the intermediate panel is in a transparent state, the operating method further comprises:
- controlling the first display panel and the second display panel to display same content; or
- controlling the first display panel and the second display panel to display complementary contents.

20. The operating method according to claim 18, wherein when the intermediate panel is in a non-transparent state, the operating method further comprises:
- controlling the first display panel and the second display panel to display same content, and making the first display panel and the second display panel independently controlled; or
- controlling the first display panel and the second display panel to display complementary contents.

* * * * *